United States Patent
Mandal (10) Patent No.: US 10,494,795 B2
(45) Date of Patent: Dec. 3, 2019

(54) AUTOMATIC FLUID FLOW CONTROLLING DEVICE FOR STOPPING FLOW OF RUNNING FLUID

(71) Applicant: Somjit Mandal, Kolkata (IN)

(72) Inventor: Somjit Mandal, Kolkata (IN)

(*) Notice: Subject to any disclaimer, the term of this patent is extended or adjusted under 35 U.S.C. 154(b) by 176 days.

(21) Appl. No.: 15/520,363

(22) PCT Filed: Jul. 1, 2016

(86) PCT No.: PCT/IN2016/000173
§ 371 (c)(1),
(2) Date: Apr. 19, 2017

(87) PCT Pub. No.: WO2017/006341
PCT Pub. Date: Jan. 12, 2017

(65) Prior Publication Data
US 2018/0002902 A1    Jan. 4, 2018

(30) Foreign Application Priority Data

Jul. 3, 2015   (IN) .............................. 729/KOL/2015

(51) Int. Cl.
*E03B 1/02*      (2006.01)
*F16K 31/20*    (2006.01)
(Continued)

(52) U.S. Cl.
CPC ................. *E03B 1/02* (2013.01); *E03B 1/04* (2013.01); *E03B 7/078* (2013.01); *F16K 15/063* (2013.01); *F16K 17/12* (2013.01); *F16K 17/34* (2013.01); *F16K 31/20* (2013.01); *E03B 1/042* (2013.01); *E03B 7/071* (2013.01); *E03B 7/075* (2013.01);
(Continued)

(58) Field of Classification Search
CPC ......... Y10T 137/7785; Y10T 137/7835; E03B 1/02; E03B 1/04; E03B 1/042; E03B 7/071; E03B 7/075; E03B 7/078; F16K 15/063; F16K 17/12; F16K 17/34; F16K 31/084;
(Continued)

(56) References Cited

U.S. PATENT DOCUMENTS 3,212,751 A  * 10/1965  Hassa .................... F16K 31/086
                                                  251/129.03
3,877,478 A  *  4/1975  Longworth ........... F16K 31/086
                                                  137/87.03
(Continued)

OTHER PUBLICATIONS

International Search Report for related application No. PCT/IN16/000173 dated Dec. 7, 2016.

*Primary Examiner* — William M McCalister
(74) *Attorney, Agent, or Firm* — D'Ambrosio & Menon, PLLC; Usha Menon (57) ABSTRACT

The present invention discloses a device for flow control of fluid in pipelines to various utility fluid outlets like water taps and the like by blocking fluid flow from pipeline to said utility fluid outlet when the flow exceeds a predetermined flow rate. In other word, the present invention discloses an automatic fluid flow controlling device for restricting and/or stopping flow of the fluid medium running through the guiding means or the tubing system when fluid flow exceed a certain flow rate as well as stopping flow of the running fluid flow when fluid level in the vessel wherein the running fluid is being delivered reaches a certain height.

12 Claims, 7 Drawing Sheets

(51) Int. Cl.
  *F16K 17/34* (2006.01)
  *E03B 1/04* (2006.01)
  *F16K 15/06* (2006.01)
  *F16K 17/12* (2006.01)
  *E03D 1/32* (2006.01)
  *F16K 31/08* (2006.01)
  *F16K 31/22* (2006.01)
  *E03B 7/07* (2006.01)

(52) U.S. Cl.
  CPC .............. *E03D 1/32* (2013.01); *F16K 31/084* (2013.01); *F16K 31/086* (2013.01); *F16K 31/22* (2013.01)

(58) Field of Classification Search
  CPC ........ F16K 31/086; F16K 31/20; F16K 31/22; E03D 1/32
  USPC .................................................. 137/498, 509
  See application file for complete search history.

(56) References Cited

U.S. PATENT DOCUMENTS

| | | | | |
|---|---|---|---|---|
| 4,128,105 | A * | 12/1978 | Follett | ................... F16K 17/34 137/1 |
| 4,245,814 | A | 1/1981 | Shimizu | |
| 4,694,860 | A | 9/1987 | Eidsmore | |
| 8,047,224 | B2 * | 11/2011 | Eichler | ................... F16K 17/30 137/454.2 |
| 8,714,189 | B2 | 5/2014 | Koeroghlian et al. | |
| 2010/0090138 | A1 | 4/2010 | Bromley | |

\* cited by examiner

$T_2 < T_3$ $T_1 < T_2 < T_3$ $\boxed{F_a << F_b}$

AUTOMATIC FLUID FLOW CONTROLLING DEVICE FOR STOPPING FLOW OF RUNNING FLUID

FILED OF THE INVENTION

The present invention relates to a technology for automatically controlling flow of running fluid. In particular, the present invention is directed to develop an automatic fluid flow controlling device adapted for stopping flow of the running fluid when the fluid flow exceed a certain flow rate as well as stopping flow of the running fluid flow when fluid level in a vessel wherein the running fluid is being delivered reaches a certain height.

BACKGROUND OF THE INVENTION

There are many instances wherein flow of a fluid medium running through a guiding means or tubing systems needs to be regulated to restrict overuse/wastage of the fluid. Desirably, such automated control of flow of the running fluid should maintain an initially set flow rate of the running fluid and automatically stop the flow of the running fluid upon detecting the flow rate exceeding the initially set flow rate.

The presently available automated system for controlling flow of fluid/water running through a guiding means or tubing systems involves complex instrumentation and operates only with the assistance of sophisticated electronics devices. Therefore, presently available automated systems for controlling flow of fluid/water running through a guiding means or tubing systems can only be applied where corresponding supports such as electric power, complex instrumentation implementing facility and like are available.

In the modern civilization, the excessive use or consumption of water from running tap in houses, railway stations, hotels and other public and industrial establishments is a serious problem considering the limited resource of useable water. Water overfilling in container is one of the major reasons of water wastage. Modern float valve based water overfilling preventing device are getting smaller day by day but they are still bulky and they have lack of flexibility. The main drawback in the modern float valve based water overfilling preventing device is that they need to be attached with the container or vessel wall and has limited range of adjustable fluid height.

It is thus, there has been a need for developing a reliable, non electric, cheap and simplistic device for automatically restricting and/or stopping flow of the running fluid when the fluid flow exceed a certain now rate as well as stopping flow of the running fluid flow when fluid level in a vessel/container wherein the running fluid is being delivered reaches a certain height without the need of contact with the container or vessel for functioning and should have a unlimited range of adjustable fluid height at the flow needs to stop.

OBJECT OF THE INVENTION

It is thus the basic object of the present invention is to develop an automatic fluid flow controlling device which would be adapted to stop flow of the running fluid when the fluid flow exceed a certain flow rate.

Another important object of the present invention is to develop an automatic liquid flow controlling device which would be adapted to stop flow of the running liquid flow when liquid level in a vessel wherein the running liquid is being delivered reaches a certain height adjustable according to the requirement by involving negative tensile spring mechanism in device operation.

Another object of the present invention is to develop an automatic fluid flow controlling device which would be adapted to operate without involving any electricity or electronic device assistance.

Yet another object of the present invention is to develop an automatic fluid flow controlling device which would be adapted to operate as a multi tasking water saving device and involve spring and valve based mechanism in which whenever water flow inside the device it will observes the flow rate of the water and can check the overflow of water, in such a condition the valve gets closed, whenever there is extra flow of water trough the device, the device acts as a safety valve which can close from inside as soon as the water extends the pressure.

Another object of the present invention is to develop an automatic fluid flow controlling device for stopping flow of the running liquid when the liquid flow exceed a certain flow rate which would be reliable in operation, cheap and easy to fabricate.

Another object of the present invention is to develop an automatic fluid flow controlling device for stopping flow of the running fluid when the fluid flow exceed a certain flow rate which would be adapted to

SUMMARY OF THE INVENTION

Thus according to the basic aspect of the present invention there is provided a device for flow control of fluid in pipelines to various utility fluid outlets like water taps, on line systems and the like by blocking fluid flow from pipeline to said utility fluid outlet when the flow exceeds a predetermined flow rate comprising:

a top chamber vertically arranged over a bottom chamber with a separating member partitioning said chambers;

said top camber comprises an entrance hole for receiving running fluid into the top chamber from said pipeline;

an inner supporting stem having at its one end confined within the top chamber a spring biased pressure releasable valve plate seal adapted to block said entrance hole while the other end of said inner supporting stem extends into the bottom chamber through an opening in said separating member;

said end of said inner supporting stem extending into the bottom chamber having a catcher plate with a detachably secured flow controlling first magnet attached with said catcher plate under magnetic interaction;

said bottom chamber having a base with an bottom outflow opening;

wherein when the fluid flow pressure in said pipeline acts on said spring biased pressure releasable valve plate seal to displace the same with said inner supporting stem extending into the bottom chamber to bring the said flow controlling first magnet connected at the catcher plate of the other end of said inner supporting stem closer to said bottom outflow opening and allows flow through said bottom opening until said allowable pre-determined flow rate through said pipeline and upon reaching said pre-determined flow rate the said flow controlling first magnet reached said bottom opening to thereby lock said outflow opening of said bottom chamber to thereby disconnect the fluid flow to said utility outlet, the magnetic attractive force between said catcher plate and said first magnet being reduced with respect to the tension of the catcher plate under extended position of its spring bias enabling automatized detachment of said first magnet from said catcher plate from its connection to said inner supporting stem thereby releasing the inner supporting stem with the catcher plate to revert back to its position to block said entrance hole in said top chamber by said spring biased pressure releasable valve plate seal to block any reverse flow through said entrance hole and close the pipeline communication.

According to another aspect in the present device for flow control of liquid in pipelines to various utility fluid outlets, said catcher plate is a magnetically active ferrous plate and comprising mechanism for resetting the device by releasing the first magnet blocking of said bottom outlet for subsequent flow control comprising means for varying the pressure inside the device for easy release of the first magnet and its fast reattachment with respect to said catcher plate under magnetic attraction.

According to another aspect in the present device for flow control of liquid in pipelines to various utility fluid outlets, said mechanism for resetting the device comprises compressed air pressure at the bottom of the first magnet from below the bottom outlet preferably comprising a cooperative faucet aerator in cooperation with any utility outlet communicatively connected to said bottom outlet, said faucet aerator enabling generating compressive force based release of the first magnet from said outflow opening of said bottom chamber and its cooperative reassembling with respect to said catcher plate connected to the inner supporting stem under magnetic interaction therebetween the two upon freeing of the first magnet from said outflow opening of said bottom chamber.

According to another aspect in the present device for flow control of liquid in pipelines to various utility fluid outlets, said mechanism for resetting the device comprises releasing the fluid pressure on top of said first magnet blocking the bottom outlet opening by cooperative outlet means for draining out fluid from said bottom chamber to thereby release of the first magnet from said outflow opening of said bottom chamber and its cooperative reassembling with respect to said catcher plate connected to the inner supporting stem under magnetic interaction therebetween the two upon freeing of the first magnet from said outflow opening of said bottom chamber.

According to another aspect in the present device for flow control of liquid in pipelines to various utility fluid outlets, comprises a common housing for said top and bottom chamber with an intermediate support plate separating the chambers and having water parsing hole through which said inner supporting stem extending into the bottom chamber and said bottom chamber having said bottom outflow opening in a support plate with cooperative washers.

According to another aspect in the present device for flow control of liquid in pipelines to various utility fluid outlets, said top chamber or said housing top is provided with cooperative means to connect to any operative pipeline carrying the liquid flow.

According to another aspect in the present device for flow control of liquid in pipelines to various utility fluid outlets, the flow rate is based on the gap therebetween the first magnet and the top of said bottom outlet opening with or without washer such that for greater flow rate of fluid the said gap is more while for desired slower flow the gap is reduced.

According to another aspect in the present device for flow control of liquid in pipelines to various utility fluid outlets, the maximum flow rate can be controlled by varying the thickness of the first magnet or the washer on top of the bottom outlet or number of the washer.

According to another aspect in the present device for flow control of liquid in pipelines to various utility fluid outlets, comprising cooperative mechanism including at least one additional magnetically cooperating actuator for said first magnet in combination with said first magnet for any utility out flow based fluid level control comprising:

said additional magnetically cooperating actuator mounted on a carrier means selectively disposed to assume an usual position away from the said bottom opening and cooperative changed position in relation to said bottom chamber opening such that when in such changed position adjacent the bottom chamber opening the said first magnet is pulled under magnetic force from its usual position attached to said catcher plate to block the bottom opening, a flexible means with a weight attached to said carrier providing fro maintaining the weight on any fluid level top such that on reaching the desired fluid level the said carrier is activated to move said additional magnetically cooperating actuator closer to said bottom opening for attracting said first magnet and block the bottom opening and stop flow of the fluid.

According to another aspect in the present device for flow control of liquid in pipelines to various utility fluid outlets, wherein said additional magnetically cooperating actuator can be selectively a magnetically actuatable ferrous plate or a second magnet in carrier is operable with respect to said first magnet for controlling fluid level at any vertical distance with equal precision.

According to another aspect in the present device for flow control of liquid in pipelines to various utility fluid outlets, said flexible means can be provided in a self winding bobbin type weight means According to another aspect in the present device for flow control of liquid in pipelines to various utility fluid outlets, comprises cooperative mechanism for determining liquid level in a vessel wherein the running liquid is being delivered and accordingly stopping the flow of the running liquid based on liquid level in the vessel wherein the running liquid is being delivered comprising:

a hinged disposition of a cooperative level maintaining a second magnet and having a flexible connector with weight;

said flexible connection enabling placing the weight on any vessel and the like for collection of liquid/water to a defined level such that upon filling of the vessel level with desired liquid/water the upward force of the water on the weight allowing the hinged second magnet to move closer to said flow controlling first magnet supported with respect to said ferrous plate at a supporting stem end and pull and place the said flow controlling first magnet on said outflow opening of said bottom chamber to block further release of liquid/water into said vessel and the like.

According to another aspect in the present device for flow control of liquid in pipelines to various utility fluid outlets, comprises said second magnet fixed with a support bar, one end of the bar is attached with a hinge joint and other end is attached with a freely suspended string;

a spring powered self rolling bobbin in a waterproof cover attached with other end of the string;

said bobbin is placed in the vessel wherein the running liquid is being delivered.

According to another aspect in the present device for flow control of liquid in pipelines to various utility fluid outlets, the second magnet is held in a distance from the first magnet within their magnetic force of attraction using a minimal tensile force produced by the weight of the bobbin and when the liquid level in the vessel reaches the bobbin, buoyancy force reduce the weight causing the second magnet to move towards the first magnet which rapidly increases tension force between the two magnets and causing the attraction force between the first magnet and second magnet exceeds the attraction force between ferrous plate and the first magnet and thus the first magnet moves towards the direction of the second magnet away from the ferrous plate and fixes itself with the washer locking the outflow opening of the bottom chamber to stop the liquid outflow.

According to another aspect in the present device for flow control of liquid in pipelines to various utility fluid outlets, height of the liquid level can be adjusted easily by adjusting the length of a freely suspended string which can be winded up.

According to another aspect in the present device for flow control of liquid in pipelines to various utility fluid outlets, comprises a liquid discharging device attached with the bottom chamber housing near exit hole comprising
  a rubber cap with hole;
  a faucet aerator with supportive airtight seal;
  pivot; and
  compressive force means for unlocking the outflow opening of the bottom chamber by compressive force based release of the first magnet from said outflow opening of said bottom chamber and its cooperative reassembling with respect to the inner supporting stem under magnetic interaction therebetween the two upon freeing of the first magnet from said outflow opening of said bottom chamber.

According to another aspect in the present device for flow control of liquid in pipelines to various utility fluid outlets, said compressive force means of unlocking of said outflow opening of said bottom chamber comprises
  switch on the faucet aerator for generating compressive force/pressure to unlock said magnet;
  wherein said switch with faucet aerator is operatively connected to said external end of said outflow opening of said bottom chamber;
  wherein the operative connection of the external end of said outflow opening of said bottom chamber to said switch with faucet aerator includes an enclosed passage/housing with an opening/ext hole, said switch on the faucet aerator adapted to be pressed to block said ext hole as a witching means for unlocking/release of said magnet from said outflow opening of said bottom chamber when the compression of air in said enclosed passage/housing generates pressure on said first magnet against the pressure of water, said first magnet being still within the magnetic force of its attraction with respect to the inner supporting stem end having the ferrous plate, said compressive force combined with the said magnetic force of attraction between said first magnet and the ferrous plate exceed the pressure of the stagnant water/liquid to release the first magnet and unlock the said outflow opening of said bottom chamber and allow subsequent discharge of liquid flow until desired flow rate is maintained through the device.

According to another aspect in the present device for flow control of liquid in pipelines to various utility fluid outlets, wherein resuming flow of the liquid after stopping flow of the running liquid by involving the compressive force means facilitates comprising
  pressing the switch on the faucet aerator for enabling the pivot to seal the rubber cap hole and compressing inner air by involving the airtight rubber cap which creates little pressure on the first magnet on the washer against the pressure of the stagnant liquid;
  combining the little amount of air pressure with the magnetic force of attraction between the first magnet and the ferrous plate to exceed the pressure of the liquid and thus enabling said first magnet to go back in its previous position and resuming flow of the liquid.

According to another aspect in the present invention, a system operative as a negative tensile spring mechanism based activating switching comprising:
  a pair of magnets spaced apart against its usual cooperative magnetic attraction involving a releasable lock of at least one said magnet;
  said releasable lock when released enabling said magnet to get attracted by the other magnet under mutual magnetic force;
  said pair of magnets when attracted under said released state providing for switching of a cooperative utility gadget/means.

According to another aspect in the, wherein said utility gadget/means comprises any cooperative electrical circuitry and/or mechanical system.

According to another aspect in the present system, said utility gadget/means comprise any electronic/electrical switching based operation/activity.

According to another aspect, the present system includes minimum tension in its initial state and maximum tension in its final state facilitating apply of a small amount of force may be just greater than zero to produce huge amount of compressive force to fulfill mechanical requirement for the small, sensitive, high performance mechanical devices.

BRIEF DESCRIPTION OF THE ACCOMPANYING DRAWINGS

FIGS. 2(a) and (b) shows operation of the present device for stopping the flow of the running fluid upon detecting the flow rate exceeding the initially set flow rate.

FIGS. 4(a) and (b) shows configuration of the present automatic fluid flow controlling device along with the means for determining liquid level in a vessel wherein the running liquid is being delivered.

FIGS. 5(a) and (b) shows operation of the present device along with the means for determining liquid level in a vessel wherein the running liquid is being delivered.

FIG. 6(a)-(f) shows a preferred manner of resetting of the present automatic flow controlling device after stopping flow of the running liquid/fluid in accordance with the present invention.

DETAILED DESCRIPTION OF THE INVENTION WITH REFERENCE TO THE ACCOMPANYING DRAWINGS

The present invention discloses a device for flow control of fluid in pipelines to various utility fluid outlets like water taps and the like by blocking fluid flow from pipeline to said utility fluid outlet when the flow exceeds a predetermined flow rate. In other word, the present invention discloses an automatic fluid flow controlling device for restricting or stopping flow of the fluid medium running through the guiding means or the tubing system when fluid flow exceed a certain flow rate as well as stopping flow of the running liquid flow when liquid level in the vessel wherein the running liquid is being delivered reaches a certain height.

Figure 1A:
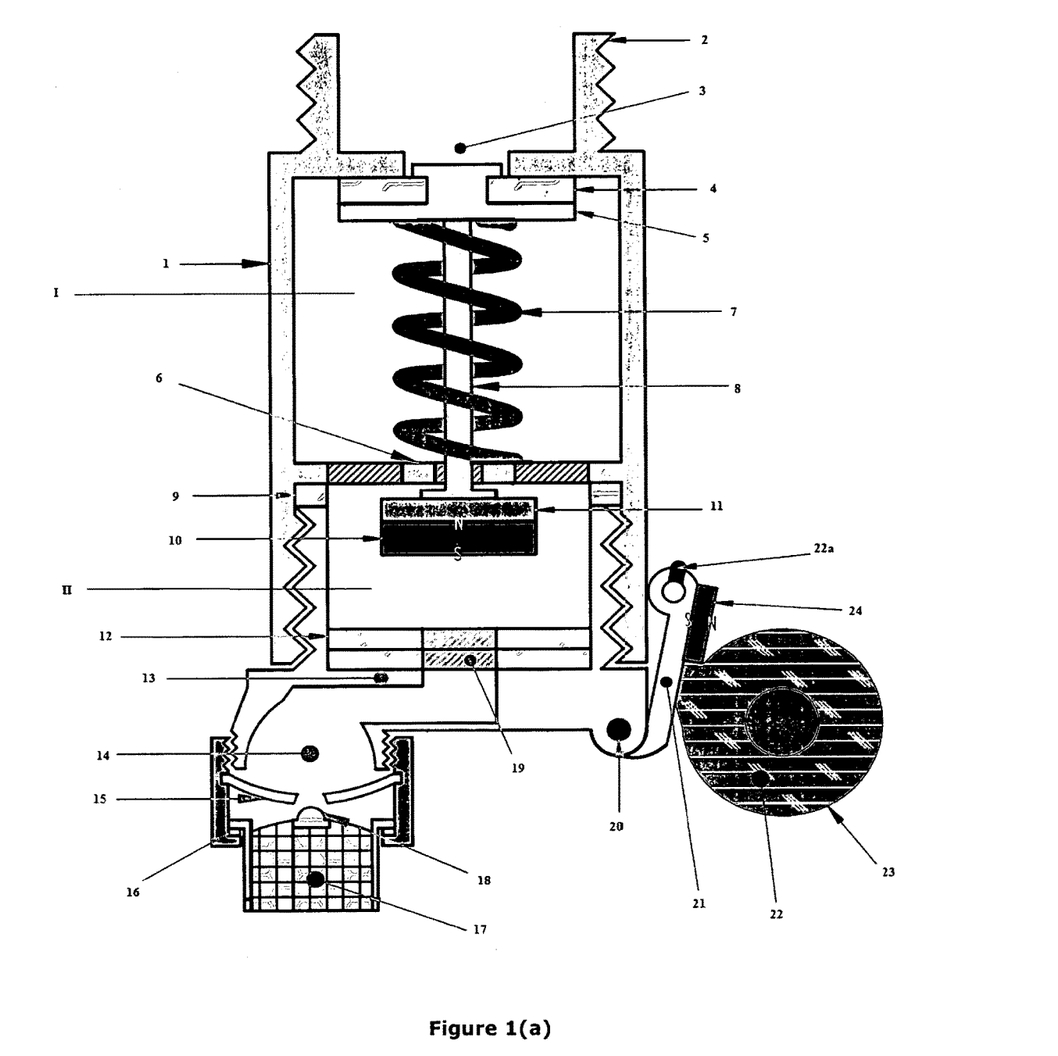
FIG. 1(a) shows a preferred embodiment of the automatic fluid flow controlling device for stopping flow of the running fluid when the fluid flow exceed a certain flow rate in accordance with the present invention.

Reference is first invited from the accompanying FIG. 1(a) which shows a preferred embodiment of the automatic flow controlling device for stopping flow of the running fluid when fluid flow exceed a certain flow rate. As shown in the accompanying FIG. 1, the main structure of the present device includes a housing body (1) for enclosing the device components. The housing body (1) can be considered as combination of a top chamber (I) vertically arranged over a bottom chamber (II) and separated by a separating member i.e. supporting plate (6). The top chamber (I) includes an connecting provision preferably externally or internally threaded portion (2) adapted to be attached with the guiding means or the tubing system such as water/fluid pipeline to receive the running fluid or water and an entrance hole (3) which is provided within the top threaded portion (2) through which the running water/fluid enter into the top chamber (I) of the cylindrical body (1).

As shown in the accompanying FIG. 1, a pressure release valve plate seal (4) fixed on a valve plate (5) is provided within the body (1) adjacent to the entrance hole (3) which moves back due to pressure of the running fluid and allowing the running fluid to enter within the top chamber. The valve plate seal (4) biased with a compressing spring (7) and an inner supporting stem (8). Other end of the compressing spring (7) is supported to the supporting plate (6).

Below of this supporting plate (6), the body (1) includes a bottom internally threaded portion wherein the bottom chamber (II) housing is threadably attached and waterproofed by using a seal (9). The compressing spring (7) is confined within the top chamber while the inner supporting stem (8) is extended into the bottom chamber (II) through one hole defined in the supporting plate (6). Around this hole, one or more water passing holes are provided in the supporting plate (6).

A catcher plate (11) preferably a ferrous plate is attached on the inner supporting stem (8) end which rests within the bottom chamber (II). A freely movable first magnet (10) is temporarily attached with the ferrous plate (11) by using magnetic interaction. A rubber washer (12) is provided on a bottom outflow opening (19) on base of the bottom chamber housing and secured over a washer support base (13). The fluid/water can coming out from the housing body (1) through the bottom outflow opening and reach at exit hole (14) wherein a fluid/water discharging device can be attached with the chamber housing.

The fluid/water discharging device preferably includes a rubber cap (15) with hole, a faucet aerator (17) with supportive airtight seal (16) and pivot (18).

Figure 1B:
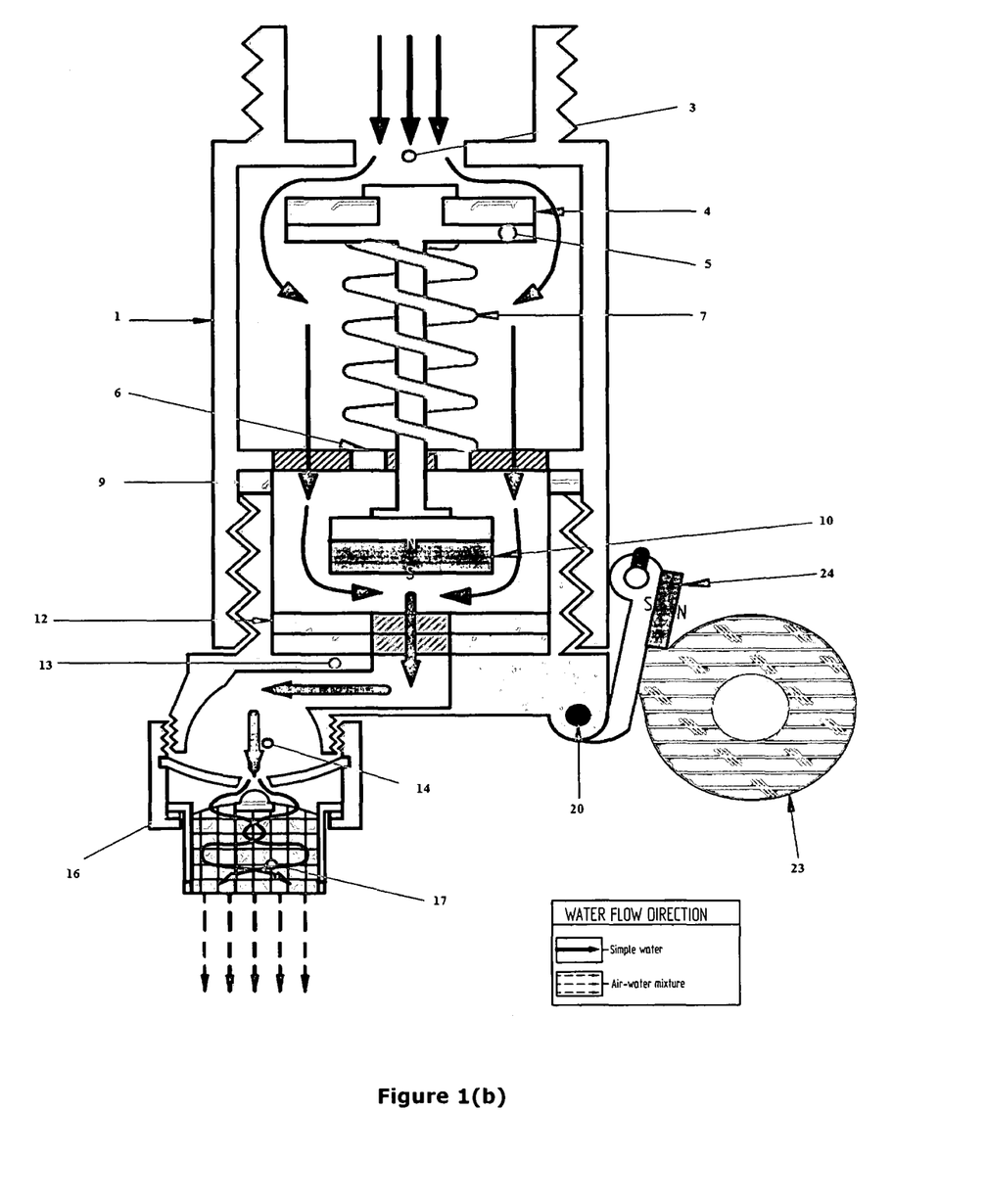
FIG. 1(b) shows direction of fluid flow within the present automatic fluid flow controlling device in accordance with the present invention.
Figure 2:
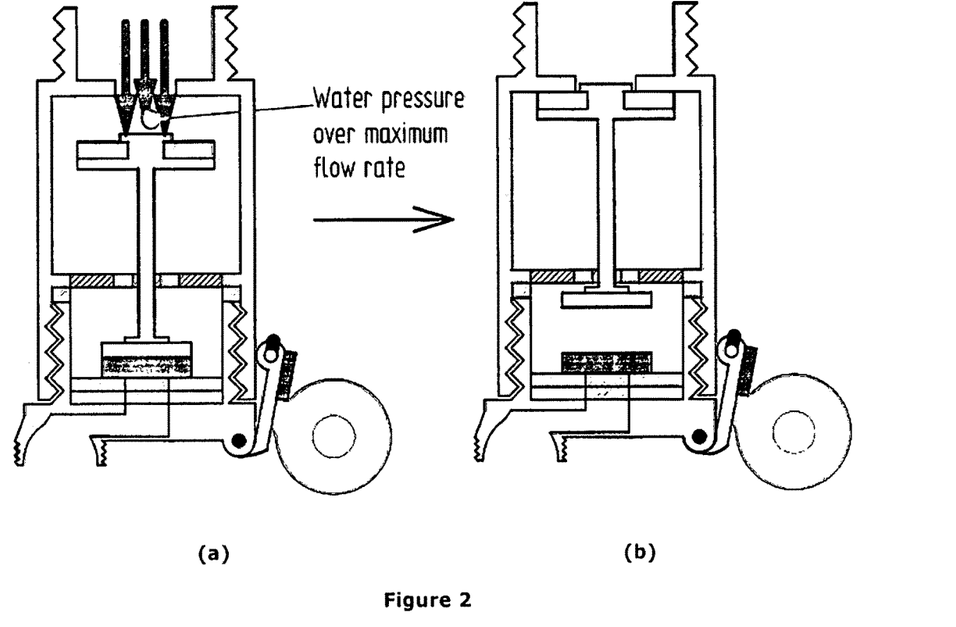

Reference is next invited to the accompanying FIG. 1(b) which shows flow direction of fluid/water within the present automatic fluid flow controlling device and operation of the device components in order to restrict and/or stop flow of the running fluid when the fluid flow exceed the certain flow rate. As shown in the referred figure, the running water/fluid which enter into the cylindrical body through the entrance hole (3) creates a pressure on the valve plate seal (4) which causes back motion of the valve plate (5) and compression of the spring (7) with the inner stem (8) which directs the ferrous plate with the first magnet (10) towards the rubber washer (12). It is thus, when the flow rate of running water/fluid increases the distance between the first magnet (10) and the rubber washer (12) decreases and with increasing flow rate if the magnet (10) touches the rubber washer (12) when the flow rate just exceeds the maximum flow rate i.e. situation shown in the accompanying FIG. 2(a) then it will act like a check valve and stops the water/fluid flow using as shown in FIG. 2(b).

It is not required that the diameter of the ferrous plate (11) and the first magnet (10) should be equal. As the first magnet block the outflow opening as a check valve, it gets attached tightly to the outflow opening (19). As the fluid outflow stops, fluid pressure in the chambers and at the entrance hole became same, so the pressure on the valve plate seal (4) is removed and thus the compressing spring (7) starts expand. As the expansion tension of the spring (7) is greater than magnetic attraction force between the first magnet (10) and the ferrous plate (11), the magnet (10) separated from the ferrous plate water and expansion of the spring (7) directs the ferrous plate (11) and the pressure release valve plate seal (4) to original position for stopping reverse flow of the fluid.

The maximum flow rate of the device can be decreased by increasing the thickness (or number) of the washer.

Figure 3:
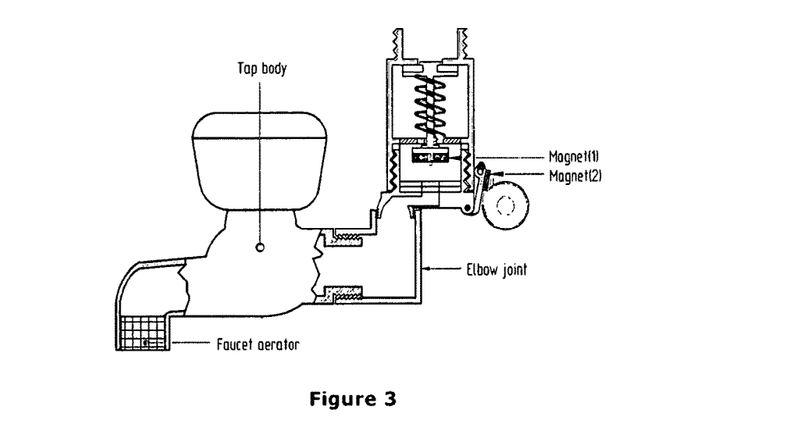
FIG. 3 shows a preferred embodiment of the present automatic fluid flow controlling device installed between a tap and running water pipe for stopping flow of the running water.

Reference is next invited from the accompanying FIG. 3 which shows a preferred embodiment of the present automatic flow controlling device installed between a tap and running water pipe for restricting and/or stopping flow of the running water. As shown in the referred figure, faucet aerator of the water discharging device decreases the flow rate of water (which is normally above the maximum flow rate of the device) through the device. So that, if the aerator or the tap is broken or removed, then the flow rate will exceed the maximum flow rate of the device, as a result the flow rate of water stops automatically.

In a preferred embodiment, the present device comprises a means for determining liquid level in a vessel wherein the running liquid is being delivered and accordingly stopping the flow of the running fluid based on fluid level in the vessel wherein the running liquid is being delivered.

Figure 4:
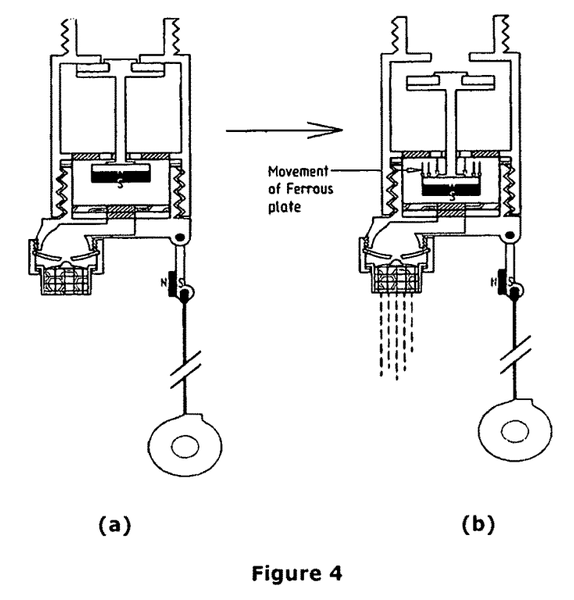

The means is externally attached with the housing body (2) and includes a second magnet (24) fixed with a support bar (21). One end of the bar (21) is attached with a hinge joint (20) from device and other end is, attached with a string knot (22a). Other end of the string (22) is also attached with a spring powered self rolling bobbin (23) in a waterproof cover. The accompanying FIG. 4(a) (before flow start) and (b) (after flow start) shows configuration of the present device along with the said means for determining liquid level in a vessel wherein the running liquid is being delivered.

Figure 5:
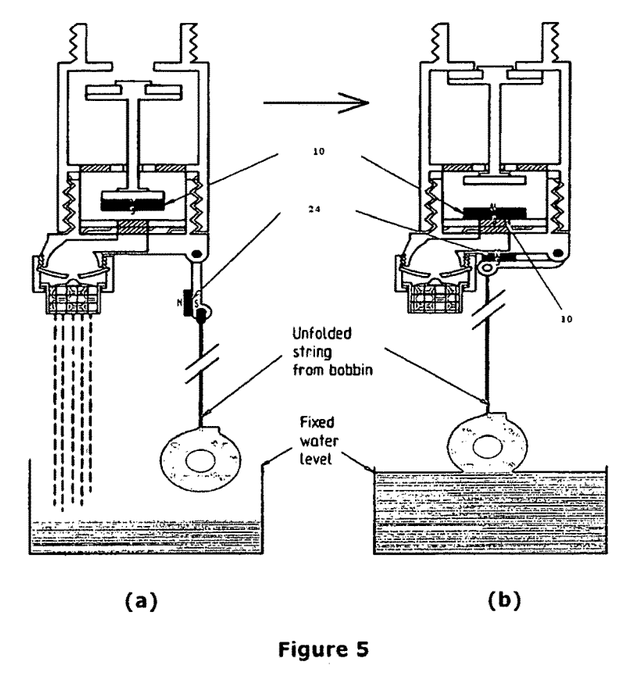

The working principle of the above said means includes negative tensile spring mechanism. The accompanying FIG. 5(a)-(b) illustrates the working principle of the means for determining liquid level in a vessel wherein the running liquid is being delivered and accordingly stopping the flow of the running liquid based on liquid level in the vessel wherein the running liquid is being delivered. Here, the second magnet (24) is held in a distance from the first magnet (10) within their magnetic force of attraction using a minimal tensile force (just above zero) produced by the weight of the covered bobbin as shown in FIG. 5(a). When the water/liquid level reaches the bobbin, buoyancy force reduce the weight as a result the second magnet (24) starts to move towards the first magnet (10) which results in rapidly increasing tension force between the two magnets. In a momentary period of time the attraction force between the first magnet (10) and second magnet (24) exceeds the attraction force between ferrous plate and the first magnet (10). As a result the first magnet (10) moves towards the direction of the second magnet (24) away from ferrous plate and fixes itself with the rubber washer (because rubber washer here acts as an obstruction in the direction of movement of the first magnet (10) which acts as a check valve and water stops flowing (shown in FIG. 5(*b*).

In the present system, the mechanism for resetting the fluid flow comprises releasing the fluid pressure on top of said first magnet blocking the bottom outlet opening by cooperative outlet means for draining out fluid from said bottom chamber to thereby release of the first magnet from said outflow opening of said bottom chamber and its cooperative reassembling with respect to the ferrous plate connected to the inner supporting stem under magnetic interaction there between the two upon freeing of the first magnet from said outflow opening of said bottom chamber.

Figure 6:
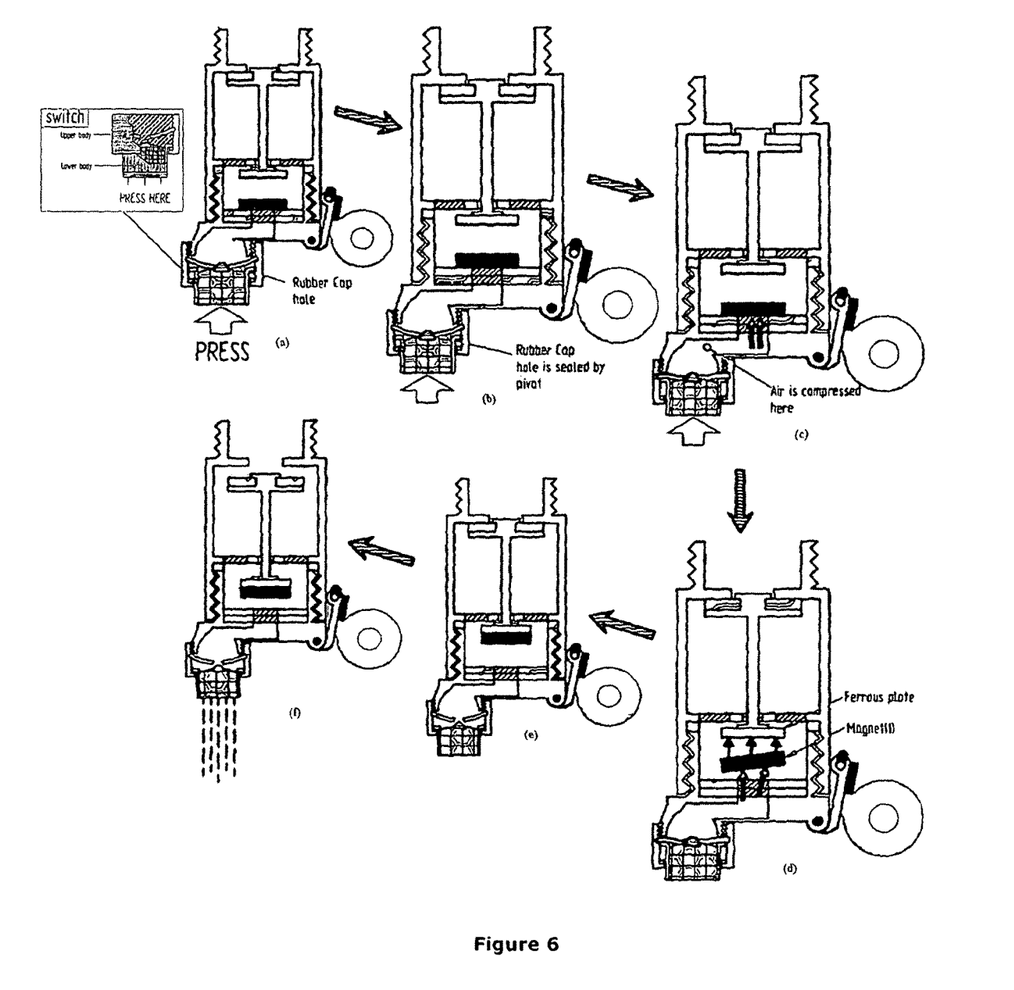

Reference is next invited to the accompanying FIG. 6(*a*)-(*f*) which shows a preferred operative sequences associated with resuming flow of the fluid/water after stopping flow of the running fluid in the present automatic flow controlling device by involving compressive force means in the fluid/water discharging device. As shown in the referred figures, upon pressing of switch (shown inset of FIG. 6*a*) provided on the faucet aerator (17), the pivot (18) will first seal the rubber cap hole (15) as shown in FIG. 6(*b*). Then the airtight rubber cap will compress the air as shown in FIG. 6(*c*) which creates a little amount of pressure on the first magnet (10) against the pressure of the stagnant water/fluid. But according to "negative tensile spring" mechanism, here ferrous plate (11) is held in a distance from the magnet (10) within its magnetic force of attraction (which is slightly below the water pressure) using a tensile force produced by water/fluid pressure. So the little amount of air pressure combined with the magnetic force of attraction exceed the huge pressure of the water/fluid as shown in the FIG. 6(*d*) and the magnet (10) will go back to its previous position as shown in FIG. 6(*e*) and the water/fluid starts flowing normally as shown in FIG. 6(*f*).

Figure 7:
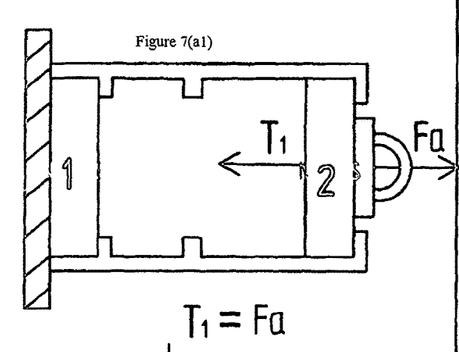
FIGS. 7 and 8 illustrates negative tensile spring mechanism in accordance with the present invention.
Figure 8:
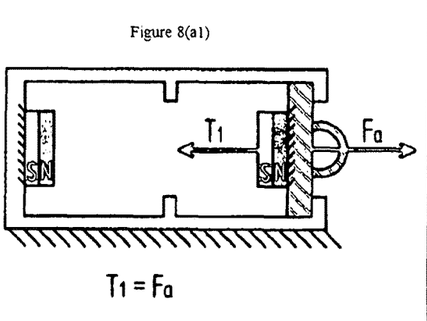

The negative tensile spring mechanism as referred hereinbefore is a specific combination between two magnets or between one magnet and one magnetic material i.e. when one magnet is held in a distance with another magnet or magnetic material within their magnetic force of attraction using a tension force (Fa) which should be greater than zero. The situation can be compared with a tensile tension spring held in tension using tensile force (Fb) which should be lower than its elastic limit (shown in FIG. 7*b*1; 8*b*1). After removing the tensile force, except the opposite behavior, the magnetic combination almost works like a simple tensile spring, so it is mentioned as negative tensile spring. The negative tensile spring has minimum tension ($T_1$) in its initial state (FIG. 7*a*1; 8*a*1) and maximum tension ($T_2$) in its final state (FIG. 7*a*2; 8*a*2). But tensile spring has maximum tension ($T_3$) in its initial state (FIG. 7*b*1; 8*b*1) and minimum tension ($T_2$) in its final state (FIG. 7*b*2; 8*b*2). So, this mechanism can be used as a substitute of tensile spring (held in tension), in those situation where one can apply a small amount of force (may be just greater than zero) but it is needed to apply or produce huge amount of compressive force to fulfill our mechanical requirement for the small, sensitive, high performance mechanical devices. It is also long lasting because of the minimum tension in its initial state.

While the present invention may have been described through reference to specific embodiments, the invention is not limited to these specific embodiments. Other changes and modifications known to those of ordinary skill are intended to be included within the scope of the present invention.

I claim:

1. A device for flow control of fluid in pipelines to various utility fluid outlets like water taps, on line systems and the like by blocking fluid flow from a pipeline to the utility fluid outlet when the flow exceeds a predetermined flow rate comprising:

a top chamber vertically arranged over a bottom chamber with a separating member partitioning the chambers, the top chamber comprises an entrance hole for receiving running fluid into the top chamber from the pipeline;

an inner supporting stem having at its one end confined within the top chamber a spring biased pressure releasable valve plate seal adapted to block the entrance hole while the other end of the inner supporting stem extends into the bottom chamber through an opening in the separating member, the end of the inner supporting stem extending into the bottom chamber having a catcher plate with a detachably secured flow controlling first magnet attached with the catcher plate under magnetic interaction;

the bottom chamber having a base with a bottom outflow opening, wherein when the fluid flow pressure in the pipeline acts on the spring biased pressure releasable valve plate seal to displace the same with the inner supporting stem extending into the bottom chamber to bring the flow controlling first magnet connected at the catcher plate of the other end of the inner supporting stem closer to the bottom outflow opening and allows flow through the bottom opening until the allowable pre-determined flow rate through the pipeline and upon reaching the pre-determined flow rate, the flow controlling first magnet reached the bottom opening to thereby releasably lock the outflow opening of the bottom chamber to thereby disconnect the fluid flow to the utility outlet, the magnetic attractive force between the catcher plate and the first magnet being reduced with respect to the tension of the catcher plate under extended position of its spring bias enabling automatized detachment of the first magnet from the catcher plate from its connection to the inner supporting stem thereby releasing the inner supporting stem with the catcher plate to revert back to its position to block the entrance hole in the top chamber by the spring biased pressure releasable valve plate seal to block any reverse flow through the entrance hole and close the pipeline communication.

2. The device for flow control of liquid in pipelines to various utility fluid outlets as claimed in claim 1, wherein the catcher plate is a magnetically active ferrous plate.

3. The device for flow control of liquid in pipelines to various utility fluid outlets as claimed in claim 1, further comprising means to release the first magnet's releasable blocking of the bottom outlet for subsequent flow and reattachment of the first magnet to the catcher plate under magnetic attraction, the means to release the first magnet is in cooperation with any utility outlet communicatively connected to the bottom outlet and enables release of the first magnet from the outflow opening of the bottom chamber and its cooperative reassembling with respect to the catcher plate connected to the inner supporting stem under magnetic interaction therebetween the two upon freeing of the first magnet from the outflow opening of the bottom chamber.

4. The device for flow control of liquid in pipelines to various utility fluid outlets as claimed in claim 1, comprising a common housing for the top and bottom chamber with the separating member separating the chambers and having a water passing hole through which the inner supporting stem extending into the bottom chamber and the bottom chamber having the bottom outflow opening in a support plate with cooperative washers.

5. The device for flow control of liquid in pipelines to various utility fluid outlets as claimed in claim 1, wherein the top chamber is provided with an externally threaded portion to connect to any liquid or water pipeline to receive running liquid or water; and an entrance hole provided within the externally threaded portion through which the running liquid or water enters into the top chamber.

6. The device for flow control of liquid in pipelines to various utility fluid outlets as claimed in claim 1, wherein the flow rate is based on a gap therebetween the first magnet and the top of the bottom outlet opening with or without a washer such that for greater flow rate of fluid the gap is more while for desired slower flow the gap is reduced.

7. The device for flow control of liquid in pipelines to various utility fluid outlets as claimed in claim 6, wherein the maximum flow rate can be controlled by varying the thickness of the first magnet or the washer on top of the bottom outlet or a number of washers.

8. The device for flow control of liquid in pipelines to various utility fluid outlets as claimed in claim 1, further comprising:
   at least one magnetic actuator for cooperating with the first magnet for any utility fluid outlet outflow control based on fluid level control, said magnetic actuator comprises
   a second magnet mounted on a support bar, the support bar is attached at one end with a hinge joint on the device and is attached at an other end with a freely suspending string; and
   a spring powered self-rolling bobbin in a waterproof cover attached to the other end of the string, the bobbin placed in a vessel to which the running liquid is delivered.

9. The device for flow control of liquid in pipelines to various utility fluid outlets as claimed in claim 8, wherein a hinged disposition of the second magnet on the support bar holds the second magnet at a distance from the first magnet within their magnetic force of attraction by a tensile force produced by the weight of the bobbin, wherein when the liquid level in the vessel reaches the bobbin, buoyancy forces reduce the weight causing the second magnet to move towards the first magnet which rapidly increases the attraction force between the two magnets and further causing the attraction force between the first magnet and second magnet to exceed the attraction force between the ferrous plate and the first magnet resulting in the first magnet moving towards the direction of the second magnet and away from the ferrous plate and fixing of the first magnet with the washer locking the outflow opening of the bottom chamber to stop the liquid outflow.

10. The device for flow control of liquid in pipelines to various utility fluid outlets as claimed in claim 9, wherein height of the liquid level to stop the liquid outflow is adjusted by adjusting the length of the freely suspended string.

11. The device for flow control of liquid in pipelines to various utility fluid outlets as claimed in claim 3, wherein the means to release the first magnet comprises:
   a rubber cap with hole;
   a faucet aerator with supportive airtight seal;
   pivot; and
   a switch on the faucet aerator for unlocking the outflow opening of the bottom chamber by a compressive force based release of the first magnet from the outflow opening of the bottom chamber and its cooperative reassembling with the ferrous plate under magnetic interaction therebetween upon freeing of the first magnet from the outflow opening of the bottom chamber.

12. A device for flow control of liquid in pipelines to various utility fluid outlets as claimed in claim 11,
   wherein the switch on the faucet aerator is operatively connected to the utility outlet of the outflow opening of the bottom chamber,
   wherein pressing of the switch on the faucet aerator enables the pivot to seal the rubber cap hole and compresses inner air of the utility outlet by involving the airtight rubber cap which creates air pressure on the first magnet on the washer against the pressure of stagnant liquid, whereby the air pressure combined with the magnetic force of attraction between the first magnet and the ferrous plate on exceeding the pressure of the stagnant liquid on the first magnet enables the first magnet to go back to its previous position and resume flow of the liquid.

* * * * *